United States Patent [19]

Osei-Gyimah

[11] Patent Number: 4,745,134
[45] Date of Patent: May 17, 1988

[54] INERT SEPARATOR BEADS FOR REGENERATION OF MIXED BED-ION EXCHANGE RESINS

[75] Inventor: Peter Osei-Gyimah, North Wales, Pa.

[73] Assignee: Rohm and Haas Co., Philadelphia, Pa.

[21] Appl. No.: 624,986

[22] Filed: Jun. 27, 1984

[51] Int. Cl.$^4$ ............................................. C08D 5/20
[52] U.S. Cl. ...................... 521/28; 526/263; 526/303.1; 526/304; 428/402
[58] Field of Search ............ 526/307.7, 303.1; 521/28

[56] References Cited

U.S. PATENT DOCUMENTS

| | | | |
|---|---|---|---|
| 3,753,958 | 8/1973 | Wingler et al. | 526/307.7 |
| 4,151,332 | 4/1979 | Chong et al. | 521/28 |
| 4,473,664 | 9/1984 | Ziarkowski | 521/28 |

FOREIGN PATENT DOCUMENTS

| | | | |
|---|---|---|---|
| 58-113214 | 7/1983 | Japan | 526/307.6 |
| 1058631 | 2/1967 | United Kingdom | 526/307.7 |

Primary Examiner—Joseph L. Schofer
Assistant Examiner—Peter F. Kulkosky
Attorney, Agent, or Firm—John E. Taylor, III

[57] ABSTRACT

Improved, inert separator beads for separating cation exchange resins from anion exchange resins during regeneration of mixed-bed exchange resins have been discovered. These beads are crosslinked copolymers of methyl methacrylate, styrene and a hydrophilic monomer containing an amide functionality, and have little tendency to clump together or clump at an air-water interface.

15 Claims, No Drawings

INERT SEPARATOR BEADS FOR REGENERATION OF MIXED BED-ION EXCHANGE RESINS

BACKGROUND OF THE INVENTION

This invention relates to inert separator beads for use with mixed-bed ion exchange resins. More particularly, it relates to spheres or beads of a crosslinked copolymer of methyl methacrylate and a hydrophilic monomer containing amide functionality, which form an inert zone separating the cation exchange resin from the anion exchange resin during regeneration of a mixed-bed resin.

Mixed-bed ion exchange resins are well known to be simple mixtures of the beads of an anion exchange resin with those of a cation exchange resin. When water or another liquid containing dissolved salt flows through a mixed-bed resin, the cation exchange beads exchange more desirable cations for the less desirable cations dissolved in the liquid, and the anion exhange beads exchange more desirable anions for the less desirable anions dissolved in the liquid. This process normally continues until the available, desirable ions of the resins have all been exchanged, whereupon these ions must be replaced by the process known as regeneration.

Cation exchange resins are normally regenerated with aqueous solutions of acids, or preferred-cation salts of acids, while anion exchange resins are normally regenerated with aqueous solutions of bases, or preferred-anion salts of the bases. Exposure of the cation resins to the cations of the anion resin regenerant, or of the anion resin to the anions of the cation resin regenerant, would effectively prevent or reverse regeneration, so the resins of a mixed bed are typically segregated for regeneration. The cation and anion exchange resins are selected with sufficiently different backwash fluidization rates, resulting from their densities and bead diameters, that classification of the resin bed by passing water upward through it causes vertical segregation of the two resins within the ion exchange columns. Regenerants are then caused to flow within their respective resins, between the top or bottom of the column and the interface of the cation exchange resin with the anion exchange resin.

It is well known to increase the thickness of this interface between the two resins by including a third, inert material in the mixed-bed resin composition which during the ion exhange treatment process is intimately mixed with the ion exchange resins, but which, because of its backwash flotation rate intermediate between those of the cation resin and the ion resin, settles between these two resins during classification prior to regeneration. As disclosed by McMullen in U.S. Pat. No. 2,666,741, this separation of the cation resin from the anion resin allows placement of the liquid inlets and outlets between them, reduces the chance of the regenerant for one resin working its way into the other resin, and allows for a reduction in bed size caused by attrition of the resins.

The separator materials, to be useful, must be neutral with respect to ion exchange properties, that is, they must be ionically neutral, having neither acidic nor basic functional ion exchange sites, and they must have a backwash fluidization rate intermediate between those of the anion exchange resin and the cation exchange resin. For practical consideration, it is helpful if the density of the separator material approaches a value intermediate between the densities of the two ion exchange resins so that the separator particle size and shape may be similar to that of the resin. The separator material should be at least as physically stable as the ion exchange resins so that shrinkage of the separation zone does not require additior of separator material before replacement of the resins. The separator material must also be resistant to attack by the influent stream and by the regenerants, which are often solutions of strong acids and strong bases. Another important criterion for the separator material is that it be wet readily by aqueous solutions.

Materials which have been used by others as inert seperator beads include beads and particles of polystyrene, polyvinyl chloride, polyethylene and hollow glass spheres. Such materials showed a tendency to aggregate with particles of the anion exchange resins, so that the backwash fluidization rates of both the resin and the separator beads were changed, and the sharpness of the classification was degraded. This problem of aggregation between the anion exchange resins and the separator beads was overcome, as disclosed by Chong et al., in U.S. Pat. No. 4,151,332, by use of a separator bead material rendered hydrophilic by inclusion of hydroxyalkyl methacrylate in its copolymer.

While the Chong et al. separator beads solved the problem of aggregation, or clumping, with the anion exchange resin beads, they left another problem unsolved, the tendency of the separator beads to cling or clump at an air-water interface, either at the surface of the liquid at the column, or around bubbles in the liquid. Under most conditions, a relatively small fraction of the separator beads cling to air-water interfaces, but all beads that do so during classification fall outside the separator layer, and to achieve the same separator thickness, an excess of separator beads must be used, reducing their efficiency as a separator. Accordingly, it is an object of the present invention to provide inert separator beads which do not cling to an air-water interface.

I have discovered inert separator beads of suitable density, which neither aggregate with anion exchange resins nor cling to air-water interfaces; these separator beads are crosslinked copolymers of methyl methacrylate, styrene, a hydrophilic monomer containing amide functionality, a polyethylenically unsaturated crosslinking monomer or mixture of such crosslinking monomers.

The inert separator resin beads of the present invention are prepared by conventional suspension polymerization techniques, employing dispersants and initiators which are well known in the art. The aqueous phase of the suspension polymerization mixture preferably contains a salt, such as sodium chloride, to reduce solubility of the hydrophilic amide monomer in water, and force it into the organic phase. This technique is again well known in suspension polymerization.

The monomers used to prepare the resin of the present invention are methyl methacrylate, a polyethylenically unsaturated crosslinking monomer, a hydrophilic monomer containing amide functionality, and styrene. The polyethylenically unsaturated crosslinking monomer or monomers include, for example, divinylbenzene, trivinylbenzene, ethylene glycol dimethacrylate, trimethylolpropane trimethacrylate and divinylnaphthalene. The preferred crosslinking monomer is divinylbenzene.

Preferred examples of the hydrophilic monomer containing amide functional groups include acrylamide, N-methyl acrylamide, N,N-dimethyl acrylamide, N-ethyl acrylamide, vinylpyrolidone, and hydroxyalkyl acrylamide wherein the alkyl group has from two to six carbon atoms, for example, N-hydroxyethyl acrylamide, N-hydroxypropyl acrylamide, N,N-dihydroxyethyl acrylamide, or N-(2,3)-dihydroxypropyl acrylamide, and the corresponding methacrylamides, namely, methacrylamide, N-methyl methacrylamide, N,N-dimethyl methacrylamide, N-ethyl methacrylamide, N-hydroxyethyl methacrylamide, N-hydroxypropyl methacrylamide, N,N-dihydroxyethyl methacrylamide, and N-(2,3)-dihydroxypropyl methacrylamide. The preferred hydrophilic monomer containing amide functional groups is methacrylamide.

The composition of the copolymer beads of the present invention is established by the amount of the monomers in the polymerization mixture. The amount of methyl methacrylate monomer may vary from about 60 to about 90%, the styrene from about 5 to about 15%, the amide monomer from about 2 to about 10% and the cross-linker from about 1 to about 6%, all percentages by weight based on the weight of the total monomer mixture. The proportions are varied such that the resulting copolymer beads have a wet density between about 1.15 and about 1.17 g/cm$^3$. The particle size is controlled by methods well known in suspension polymerization, primarily by agitation rate, and is selected within a range from about 150 $\mu$m to about 1 mm, in average diameter, preferably from about 400 to about 800 $\mu$m, the specific size being chosen to allow the hydraulic density to fall midway between the hydraulic densities of the cation exchange resin and the anion exchange resin with which the separator beads will be used.

Typically, the separator beads of the present invention are mixed with beads of cation exchange resin and anion exchange resin in an amount of from about 10 to about 15% by volume, based on the total volume of the resins, although for special applications amounts greater or smaller than this may be selected. Prior to operation of the ion exchange bed for ion exchange, all three of the bead types will be mixed together, but during hydraulic classification prior to regeneration of the ion exchange resins, the ion exchange resins will be separated cleanly into two distinct vertical strata within the ion exchange column, with the separator beads lying between these two strata.

The separator beads of the present invention may be prepared by conventional suspension polymerization, using free-radical initiators, suspension aids, agitation rates, and the like, that are well known in the art. Alternatively, an expanded seed polymerization process may be used. In this process styrenic or acrylic monomers or mixture of the two are polymerized with light crosslinking to form seed beads of a size smaller than the particle size ultimately desired. These seed beads are expanded or grown, by suspending them in an emulsion of monomers including methyl methacrylate, an amide-containing monomer and a polyvinyl unsaturated, crosslinking monomer, together with a conventional emulsifier and polymerization initiator. In the expanded seed polymerization process, the preferred composition of the seeds is established by monomer fractions of from about 20 to about 75% methyl methacrylate, and more preferably from about 40 to about 60% methyl methacrylate, and a crosslinker monomer level from about 0.5 to about 1%, the balance being styrene. These monomers are polymerized in a conventional, suspension polymerization to produce a density from about 1.05 to about 1.15 g/cm$^3$, and a particle size from about 150 to about 500 $\mu$m in average diameter. The preferred monomer feed composition for the seed expansion polymerization is from about 70 to about 90% methyl methacrylate, from about 3 to about 10% hydrophilic, amide-containing monomer, preferably methacrylamide, and from about 2 to about 6% of crosslinking monomer. In both the seed formation and seed expansion polymerization, the preferred cross-linking monomer is divinylbenzene. During the seed expansion polymerization, the preferred ratio of feed monomer to seed is 4:1, and the resulting beads have a wet density of from about 1.15 to about 1.17 g/cm$^3$, and a preferred particle diameter from about 400 to about 800 $\mu$m.

The following examples illustrate the invention, and not to limit it except as it is limited in the claims. All fractions are by weight, and all reagents are of good commercial quality.

EXAMPLE 1

This example illustrates suspension copolymerization of separator beads of the present invention, from a monomer mixture of methyl methacrylate, styrene, methacrylamide and divinylbenzene. A gelatin solution was prepared by suspending 2.1 g of gelatin in 30 g of water and maintaining the mixture at 60° C. A separate, sodium chloride solution was prepared by dissolving 40.8 g of sodium chloride in 170 g of water with stirring in a 1-liter flask. To this flask, 9.3 g of poly(diallyldimethylammonium chloride) and the gelatin solution were added. The resulting solution was allowed to equilibrate at room temperature. A monomer mixture was prepared by mixing 144.4 g of methyl methacrylate, 13.7 g of commercial (54%) divinylbenzene, 9.31 g of methacrylamide, 18.68 g of styrene, and 0.04 g of quinone as an inhibitor. To this mixture 2.7 g of lauroyl peroxide initiator was added and dissolved with stirring. The monomer mixture was transferred to the flask containing the aqueous solution, and the resulting mixture was stirred at 140 rpm to produce a stable dispersion of monomer droplets in the aqueous phase within 15 minutes. The mixture was heated to 72° C. over a period of 20 minutes, and held at a temperature between 72° and 75° C. for one hour. After this initial heating period, the external heat was removed, and the reaction mixture was allowed to heat spontaneously to between 85 and 90° C.; this temperature was maintained by external cooling and by the addition of about 75 ml chilled water to the reaction flask. After the exotherm, when the temperature began to drop, the reaction mixture was heated externally to 92° C. and maintained at that temperature for 2 to 5 hours. The mixture was then allowed to cool, the liquid was removed by suction, and the beads were washed three times with water. About 500 ml of water were added to the flask, the mixture was heated to boiling, and about 200 ml of water were removed by boiling. The mixture was allowed to cool, the water was removed by suction, and the beads were washed three more times with water, filtered out, and dried. The beads were sieved, and those passing 710$\mu$m and retained on 425$\mu$m sieves, 62% by weight of the total weight of wet beads, were retained. The density of the wet beads was 1.168 g/cm$^3$ and the beads were 98% solids.

EXAMPLE 2

This example illustrates the preparation of an inert separator resin by the expanded seed polymerization process. The seed beads contain 50% styrene and 50% methyl methacrylate, based on the total weight of monovinyl monomers and 1.0% divinylbenzene based on the total weight of monomers. These seeds were expanded in a monomer mixture containing 87.4% methyl methacrylate, 5.0% methacrylamide and 7.5% commercial (58%) divinylbenzene.

An aqueous solution of 94.0 g sodium chloride and 1.98 g sodium nitrate was prepared in a 1-liter flask, and 13.75 g poly(diallyldimethylammonium chloride) was subsequently added. A solution of 3.96 g gelatin in 100 g water was added to the flask, and the flask was blanketed with nitrogen. A monomer mixture of 266.9 g methyl methacrylate, 266.9 g styrene and 5.1 g commercial (58%) divinylbenzene was prepared, and 8.25 g of t-butyl peroctoate initiator was added. The monomer mixture was added to the aqueous mixture in the flask, the resulting reaction mixture was stirred at 200 rpm, and was heated to 75° C. and maintained at that temperature for 5 hours. The temperature was increased to 92° C., and held at that temperature for 2.5 hours, after which the mixture was allowed to cool. The liquid portion was then removed by vacuum, and the beads were washed twice with water. About 500 ml of fresh water were added, the mixture was heated to boiling, and about 200 ml of water were removed by boiling. The mixture was cooled, and water was drawn off by vacuum. The beads were washed again, dried, and sieved. The fraction passing 425 μm and retained on 250 μm sieves, 65% of the total bead weight, was retained. The wet density of this material was 1.104 g/cm³ and the solids were from 98 to 100%. A 40.0 g sample of these seed beads was transferred to a 1-liter flask, and suspended in a solution of 100 g of water containing 31.34 g sodium chloride. This suspension was heated to 75° C., and maintained at that temperature under a nitrogen blanket. A monomer mixture of 149.8 g methyl methacrylate, 8.66 g methacrylamide and 12.88 g commercial (58%) divinylbenzene was prepared. An aqueous mixture of 34.6 g aqueous 10% Triton ® QS-44 anionic, phosphate ester surfactant (product of Rohm and Haas Company, Philadelphia, Pa. 19105) in 130.0 g of water was prepared, added to the monomer mixture, and the resulting mixture was shaken to produce a stable emulsion. A 10 ml portion of 0.01% p-nitrosophenol in 4% sodium hydroxide was added to the emulsion followed by 1.73 g of t-butyl peroctoate. The emulsion was then fed into the flask containing the suspended seed beads over a 2.5-hour period, maintaining the temperature and nitrogen blanket. After addition of the monomer, the temperature was maintained for 2 hours, then raised to 90° C. for an additional 2 hours, under the nitrogen blanket. The mixture was then cooled to 40° C., the liquid was removed by suction, and the beads were washed twice with fresh water. About 500 ml of fresh water were added, and the mixture was heated to 100° C., the water being removed using a Dean-Stark trap. The mixture was cooled, the water was removed, and the beads were washed with fresh water and dried. The wet density of the beads was 1.15 g/cm³, and the yield was 87%, by weight, of 98%-solids beads.

EXAMPLE 3

This example illustrates the hydrolytic stability of the inert separator resin from Example 1 with typical regenerant solutions. The hydrolytic stability of beads was determined by immersing the beads in concentrations of regenerants in Table I, for 30 days at 50° C., and subsequently determining the solids percentage of the beads. As shown in Table I, no significant change in the solids percentage occurred, and therefore no significant hydrolysis of the beads in the regenerant solutions occurred. As further evidence of hydrolytic stability, the regenerant solutions to which the beads had been exposed were analyzed for hydrolysis products, as total organic carbon; the results of this analysis were less than 25 ppm for total organic carbon each solution.

TABLE I

| HYDROLYTIC STABILITY TEST (Initial Solids = 94.1% by weight) | |
|---|---|
| Regenerant Solution | Wet Solids After Exposure |
| 4% NaOH | 88.7 |
| 15% NaOH | 92.0 |
| 10% HCl | 87.3 |
| 6% $H_2SO_4$ | 91.7 |
| D.I. water | 92.0 |

EXAMPLE 4

This example illustrates the low content of water extractables in the separator beads. Three samples of the separator beads from Example 1 were continuously extracted with water in a Soxhlet extractor for 72 hours. The water extract was analyzed for total organic carbon, and in each case the result was less than 70 ppm.

EXAMPLE 5

The procedure of Example 1 was repeated, except that the monomer percentages were 82.7% methyl methacrylate, 5% styrene, 5% methacrylamide and 7.3% commercial (54%) divinylbenzene. The true wet density of the resulting beads was 1.175 g/cm³.

EXAMPLE 6

This example illustrates the use of the inert separator beads of the present invention. In a 5-cmdiameter column, 337 ml of AMBERLITE ® IRA-900 strongly basic, macroreticular, styrenic anion exchange resin in the chloride form, having a particular size of 425 μm to 850 μm, 225 ml of AMBERLITE ® strongly acidic, macroreticular, styrenic cation exchange resin in the sodium form, having a particle size of approximately 500 μm, and 50 ml of the separator beads of Example 1, having a diameter of from 500 μm to 850 μm, were combined and mixed. The mixed bed was backwashed to classify and separate the three components, which were then allowed to settle. A visual inspection of the resulting bed showed a sharp stratification of three separate components.

I claim:

1. Improved, inert separator beads for separating anion exchange resin beads from cation exchange resin beads during regeneration of mixed-bed ion exchange resins, which inert separator beads comprise a copolymer of from about 60 to about 90 weight percent methyl methacrylate, from about 5 to about 15 weight percent styrene, from about 2 to about 10 weight percent hydrophilic monomer containing an amide functional group, and from about 1 to about 6 weight percent polyvinyl crosslinking monomer, the percentages based upon the total weight of the copolymer.

2. The separator beads of claim 1 wherein the hydrophilic monomer is selected from the group consisting of acrylamide, N-methyl acrylamide, N,N-dimethyl acrylamide, N-ethyl acrylamide, vinyl-pyrolidone, hydroxyalkyl acrylamide where the alkyl group has from 2 to 6 carbon atoms, and the corresponding methacrylamides.

3. The separator beads of claim 1 wherein the hydrophilic monomer is methacrylamide.

4. The separator beads of claim 1 wherein the polyvinyl crosslinking monomer is selected from the group consisting of divinylbenzene, trivinylbenzene, ethylene glycol dimethacrylate, trimethylolpropane, trimethacrylate and divinylnaphthalene.

5. The separator beads of claim 1 wherein the polyvinyl crosslinking monomer is divinylbenzene.

6. The separator beads of claim 1 wherein the separator beads have a wet density between about 1.15 and about 1.17 g/cm$^3$.

7. The separator beads of claim 1 wherein the separator beads have a particle size range from about 150 μm to about 1 mm in average diameter.

8. The separator beads of claim 7 wherein the particle size is from about 400 to 800 μm in average diameter.

9. A mixed-bed ion exchange resin comprising cation exchange resin beads, anion exchange resin beads, and inert separator beads which comprise a copolymer of from about 60 to about 90 weight percent methyl methacrylate, from about 5 to about 15 weight percent styrene, from about 2 to about 10 weight percent hydrophilic monomer containing an amide functional group, and from about 1 to about 6 weight percent polyvinyl crosslinking monomer, the beads having a hydraulic density between that of the cation exchange resin and that of the anion exchange resin.

10. The mixed-bed ion exchange resin of claim 9 wherein from about 10 to about 15 volume percent of the mixed-bed resin is inert separator beads.

11. The mixed-bed resin of claim 9 wherein the inert separator beads have an average diameter from about 150 μm to about 1 mm.

12. The mixed-bed resin of claim 9 wherein the inert separator beads have an average diameter from about 400 to about 800 μm.

13. The mixed-bed resin of claim 9 wherein the wet density of the inert separator beads is from about 1.15 to about 1.17 g/cm$^3$.

14. The separator beads of claim 1 wherein the copolymer is a copolymer of from about 60 about 90 weight percent methylmethacrylate, from about 5 to about 15 weight percent styrene, from about 5 to about 10 weight percent hydrophilic monomer containing amide functional groups, and from about 1 to about 6 weight percent polyvinyl crosslinking monomer.

15. The mixed-bed ion exchange resin of claim 9 wherein the inert separator beads comprise a copolymer of from about 60 to about 90 weight percent methylmethacrylate, from about 5 to about 15 weight percent styrene, from about 5 to about 10 weight percent hydrophilic monomer containing an amide functional group and from about 1 to about 6 weight percent polyvinyl crosslinking monomer.

* * * * *